US009992432B2

(12) United States Patent
Nazemi

(10) Patent No.: US 9,992,432 B2
(45) Date of Patent: *Jun. 5, 2018

(54) GAIN NORMALIZATION AND NON-UNIFORMITY CORRECTION

(71) Applicant: Sensors Unlimited, Inc., Princeton, NJ (US)

(72) Inventor: Jonathan Nazemi, Doylestown, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 212 days.

This patent is subject to a terminal disclaimer.

(21) Appl. No.: 14/987,372

(22) Filed: Jan. 4, 2016

(65) Prior Publication Data

US 2017/0195599 A1 Jul. 6, 2017

(51) Int. Cl.
*H04N 5/365* (2011.01)
*H04N 5/33* (2006.01)
(Continued)

(52) U.S. Cl.
CPC ............ *H04N 5/3655* (2013.01); *H04N 5/33* (2013.01); *H04N 5/3651* (2013.01); *H04N 5/378* (2013.01)

(58) Field of Classification Search
CPC ......... H04N 5/3655; H04N 5/378; H04N 5/33
(Continued)

(56) References Cited

U.S. PATENT DOCUMENTS 4,587,563 A 5/1986 Bendell et al.
5,756,999 A * 5/1998 Parrish .................. G01J 5/20
250/332
(Continued)

FOREIGN PATENT DOCUMENTS

DE 102014108971 A1 12/2015
EP 1130907 A2 9/2001
(Continued)

OTHER PUBLICATIONS

Extended European Search Report, European Patent Office, dated May 3, 2017, in corresponding European Patent Application No. 17150262.

*Primary Examiner* — Hee-Yong Kim
(74) *Attorney, Agent, or Firm* — Locke Lord LLP; Scott D. Wofsy; Joshua L. Jones

(57) ABSTRACT

A method of normalizing FPA system gain and correcting pixel non-uniformity for varying temperature includes determining an FPA temperature, calculating an FPA system gain as a function of the FPA temperature, and applying the FPA system gain at the FPA temperature to condition output of the FPA to produce temperature independent image data. The method also includes calculating a non-uniformity correction map on a pixel by pixel basis for the FPA, wherein non-uniformity correction for each pixel is a function of the FPA temperature, and applying the non-uniformity correction map to the imaging data from the FPA to produce temperature dependent non-uniformity corrected image data. An imaging system includes a focal plane array (FPA), a temperature sensor operatively connected to measure temperature of the FPA, and a module configured for system gain correction and non-uniformity correction as described above.

13 Claims, 3 Drawing Sheets

(51) Int. Cl.
  *H04N 5/378*   (2011.01)
  *H04N 5/374*   (2011.01)
  *G01J 5/00*    (2006.01)
  *H05B 1/02*    (2006.01)

(58) Field of Classification Search
  USPC .......................................................... 348/164
  See application file for complete search history.

(56) References Cited

U.S. PATENT DOCUMENTS

| | | |
|---|---|---|
| 6,504,155 B1 | 1/2003 | Ookawa |
| 7,235,785 B2 | 6/2007 | Hornback et al. |
| 7,679,048 B1 | 3/2010 | Aziz et al. |
| 2002/0166967 A1 | 11/2002 | Kaufman et al. |
| 2012/0050539 A1 | 3/2012 | Naimi et al. |
| 2014/0139643 A1 | 5/2014 | Hogasten et al. |
| 2014/0340154 A1 | 11/2014 | Lin |
| 2015/0009337 A1* | 1/2015 | Minlong .................. H04N 5/33 348/166 |

FOREIGN PATENT DOCUMENTS

| | | |
|---|---|---|
| EP | 1698873 A1 | 9/2006 |
| JP | H1023335 A | 1/1998 |
| WO | WO-2014173464 A1 | 10/2014 |

\* cited by examiner

GAIN NORMALIZATION AND NON-UNIFORMITY CORRECTION

STATEMENT REGARDING FEDERALLY SPONSORED RESEARCH OR DEVELOPMENT

This invention was made with government support under contract number N00014-14-C-0061 awarded by the United States Navy, and contracts number W15P7T-06-D-E402/53 and W15P7T-10-D-D413/R23G awarded through the Marine Corps Systems Command (MARCORSYSCOM). The government has certain rights in the invention.

BACKGROUND OF THE INVENTION

1. Field of the Invention

The present disclosure relates to imaging, and more particularly to focal plane arrays such as used in imaging systems.

2. Description of Related Art

A typical focal plane array (FPA) has a system gain that is not constant as a function of temperature. System gain is important in producing accurate image data, and since the temperature of an FPA varies, e.g., based on changes in the environment external to the imaging system as well as changes in temperature due to changes in operation within an imaging system, variation in temperature gain can present a challenge to creating accurate image data. A typical solution for this problem is to utilize thermoelectric cooling to control the temperature of the FPA. As long as the thermoelectric cooling maintains a constant, known temperature at the FPA, and as long as the correct system gain at that temperature is known, the FPA can be used to produce accurate image data.

A typical focal plane array (FPA) also has pixel to pixel variation in behavior due to manufacturing variance and the like. This variation is typically addressed by calibrating each pixel and saving the pixel by pixel calibration data as a correction map used to correct signals from the pixels to produce accurate image data. Pixel performance varies as a function of temperature, and so the temperature at which the correction map is created is the temperature at which the system generates the most accurate images—changes in temperature at the FPA will reduce the effectiveness of the correction map. A typical solution for this problem is to use thermoelectric cooling to control the temperature of the FPA as described above. As long as the thermoelectric cooling maintains a constant, known temperature at the FPA, and using a correction map that corresponds to that known temperature, the FPA can be used to produce accurate image data regardless of ambient temperature.

Such conventional methods and systems have generally been considered satisfactory for their intended purpose. However, there is still a need in the art for improved imaging techniques. The present disclosure provides a solution for this need.

SUMMARY OF THE INVENTION

A method of normalizing FPA system gain and correcting pixel non-uniformity for varying temperature includes determining an FPA temperature, calculating an FPA system gain as a function of the FPA temperature, and applying the FPA system gain at the FPA temperature to condition output of the FPA to produce temperature independent image data. The method also includes calculating a non-uniformity correction map on a pixel by pixel basis for the FPA, wherein non-uniformity correction for each pixel is a function of the FPA temperature, and applying the non-uniformity correction map to the imaging data from the FPA to produce temperature dependent non-uniformity corrected image data.

Calculating the non-uniformity correction map can include a process that does not itself perform a system gain correction in calculating the non-uniformity correction map. Calculating the FPA system gain can include calculating the FPA system gain as a function of system gain for the FPA at a reference temperature and empirically derived coefficients. Non-uniformity correction for each pixel can be a function empirically derived coefficients.

Applying the FPA system gain can include applying the FPA system gain to a ROIC operatively connected to the FPA to condition electrical signals from the FPA for imaging. The method can include receiving imaging data from the FPA which can include transmitting the imaging data to the ROIC from the FPA, wherein the ROIC is operatively connected to the FPA to condition electrical signals from the FPA for imaging. Applying the non-uniformity correction map to the imaging data can include applying the non-uniformity correction map to the imaging data from the ROIC.

Applying the FPA system gain and applying the non-uniformity correction map can be performed without controlling the temperature of the FPA. Calculating the FPA system gain can be governed by $$Vgain(T) = [(p1 + p3*Tref)*Vgainref + p2*(Tref - T)]/(p1 + p3*T)$$

wherein Vgain is a variable control level which correlates to the FPA system gain, Vgainref is the value of the control level which sets the FPA system gain at the reference temperature (Tref), and p1, p2, and p3 are empirically derived coefficients.

Calculating a non-uniformity correction map on a pixel by pixel basis can be governed by $$\delta Ic = [p0 + p1 \times \log 10(T)] \times \left( Iraw - \sum_{n=0,1,3,5} \left( a_n \times \left( \frac{T - T_{min}}{T_{max} - T_{min}} \right)^n \right) \right)$$

wherein δIc represents the change for a respective pixel from its dark level to a desired correction value, Iraw is the raw value of the pixel in digital numbers, Tmax and Tmin are maximum and minimum temperatures, respectively, for normalizing FPA temperature T, and p0, p1, and a0, a1, a3, and a5 are empirically derived coefficients.

An imaging system includes a focal plane array (FPA), a temperature sensor operatively connected to measure temperature of the FPA, and a module. The module is operatively connected to the FPA and temperature sensor to calculate FPA system gain for the FPA as a function of the FPA temperature, system gain for the FPA at a reference temperature, and empirically derived coefficients, and to apply the FPA system gain to condition output of the FPA to produce temperature independent image data, and to apply a non-uniformity correction map on a pixel by pixel basis for the FPA as a function of the FPA temperature and empirically derived coefficients, and to apply the non-uniformity correction map to condition output of the FPA to produce temperature dependent non-uniformity corrected image data.

A ROIC can be operatively connected to the FPA to condition electrical signals from the FPA for imaging, wherein the module is operatively connected to the FPA through the ROIC, wherein applying the FPA system gain includes applying the FPA system gain to the ROIC, and wherein applying the non-uniformity correction map to the imaging data includes applying the non-uniformity correction map to the imaging data from the ROIC.

There need be no temperature control device connected for temperature control of the FPA. The FPA can include a buffered current mirror pixel architecture. It is also contemplated that the FPA can include an InGaAs material for infrared imaging.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
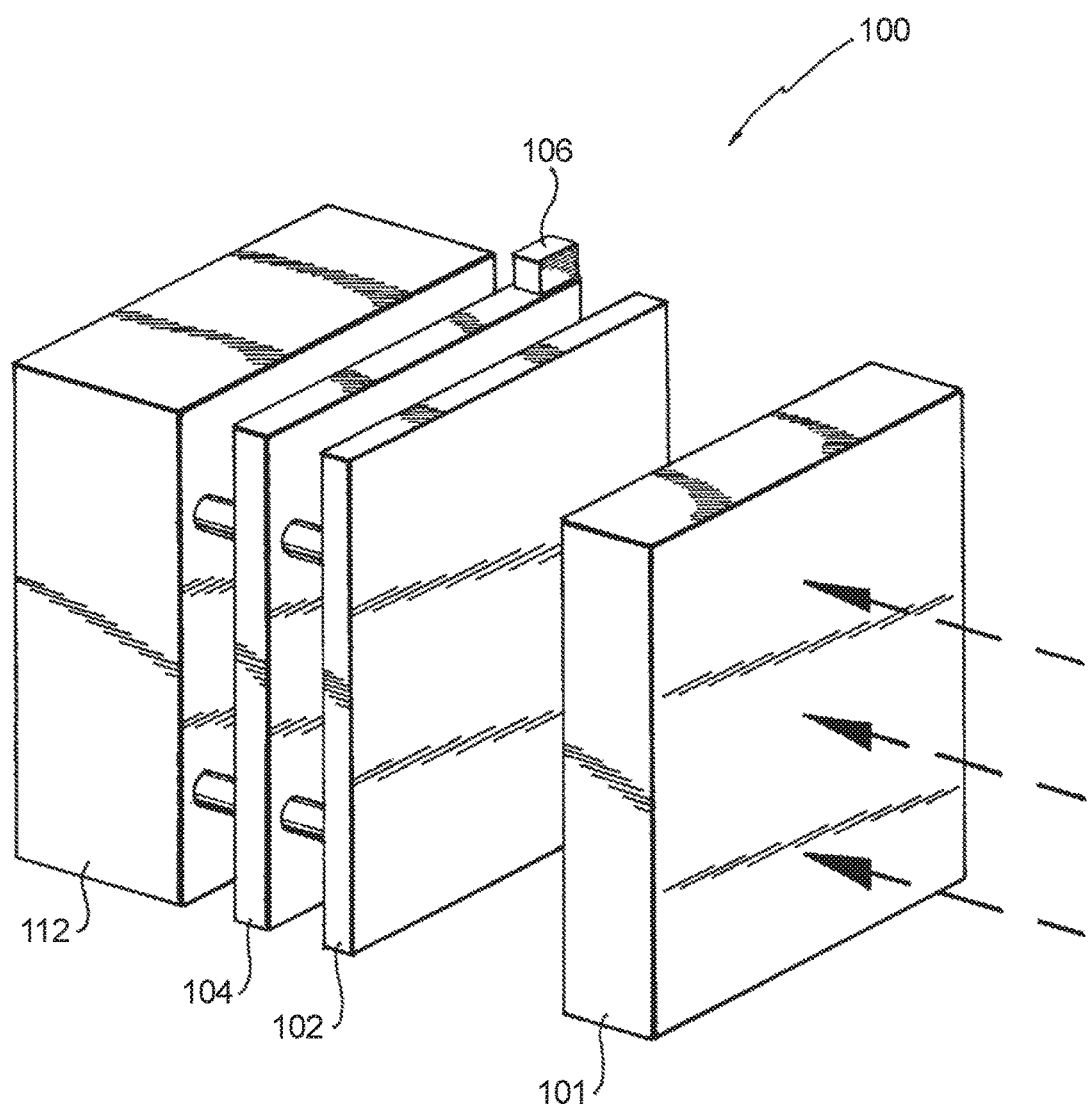
FIG. 1 is a schematic view of an exemplary embodiment of an imaging system constructed in accordance with the present disclosure, showing the focal plane array (FPA)

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems in accordance with the disclosure, or aspects thereof, are provided in FIGS. 2-3, as will be described. The systems and methods described herein can be used for accurate imaging using non-temperature controlled focal plane arrays.

Imaging system 100 includes a focal plane array (FPA) 102, and lens optics 101 for focusing images on FPA 102, as indicated by the three large arrows in FIG. 1. FPA 102 can be of any suitable array type, for example a two-dimensional array with a 640 by 512 grid of pixels. However, any other suitable array configuration, including one-dimensional arrays, can be used without departing from the scope of this disclosure.

A Read-Out Integrated Circuit (ROIC) 104 is operatively connected to the array of sensor 102 to condition electrical signals from the array for imaging. A temperature sensor 106 is operatively connected to ROIC 104. As the FPA 102 and ROIC 104 are in relative temperature equilibrium, temperature sensor 106 provides sufficient temperature readings to accurately represent the temperature of FPA 102. ROIC 104 is operatively connected to FPA 102 to condition electrical signals from the array for imaging. A module 112 is operatively connected to ROIC 104. The module 112 provides electronic architecture such that signals from ROIC 104 can be conditioned for signal output, and analyzed with embedded logic such as that within a field programmable gate array (FPGA). Within module 112, the new control value Vgain, described further below, is calculated based on input from ROIC 104. The new control value is then set in ROIC 104 to achieve the desired level of gain compensation. There need be no temperature control device, such as a thermoelectric cooling device, connected for temperature control of FPA 102. FPA 102 can include a buffered current mirror pixel architecture, or any other suitable architecture. It is also contemplated that FPA 102 can include an InGaAs material for infrared imaging.

A method of normalizing FPA system gain, e.g., in imaging system 100, for varying temperature includes determining the FPA temperature, e.g., using temperature sensor 106, and calculating an FPA system gain as a function of the FPA temperature, the system gain for the FPA at a reference temperature, and empirically derived coefficients. The method also includes applying the FPA system gain at the FPA temperature to condition output of the FPA to produce temperature independent image data, which can be output, e.g., by module 112.

Applying the FPA system gain can be performed without controlling the temperature of the FPA 102. The function of the FPA temperature, system gain for the FPA at the reference temperature, and empirically derived coefficients can incorporate approximating change in system gain at the FPA temperature compared to the system gain at the reference temperature. The reference temperature can be room temperature, e.g., 20° C. or any other suitable temperature.

As a function of the FPA system gain, Vgain, and temperature, T, let Z be defined as follows:

$$Z = \log(\Delta \text{Response}/\Delta \text{Power})$$

where ΔResponse is the change in electro-optical response given change in incident optical power ΔPower. A model of the form shown below can be used to approximate the system performance wherein temperature T varies:

$$Z = p0 + p1 \cdot V\text{gain} + p2 \cdot T + p3 \cdot V\text{gain} \cdot T$$

where p0, p1, p2, and p3 are constants that can be calibrated for a given system. This model can be used for calculating FPA system gain. For example, solving the equation immediately above for Vgain and substituting the value for Z obtained at a known reference temperature where Vgain is known, provides a formula for calculating the FPA system gain as a function of the FPA temperature, system gain for the FPA at a reference temperature, and empirically derived coefficients:

$$V\text{gain}(T) = [(p1 + p3 * T\text{ref}) * V\text{gainref} + p2 * (T\text{ref} - T)]/(p1 + p3 * T)$$

wherein Vgain is a variable control level which correlates to the FPA system gain, Vgainref is the value of the control level which sets the FPA system gain at the reference temperature (Tref), and p1, p2, and p3 are empirically derived coefficients. The units of temperature are arbitrary as long as they are consistent, and may be reported, e.g., in Kelvin, Celsius, or digital numbers such as a 12-bit integer. The coefficients p1, p2, and p3 can thus be determined to allow the formula to work on any temperature scale.

Figure 2:
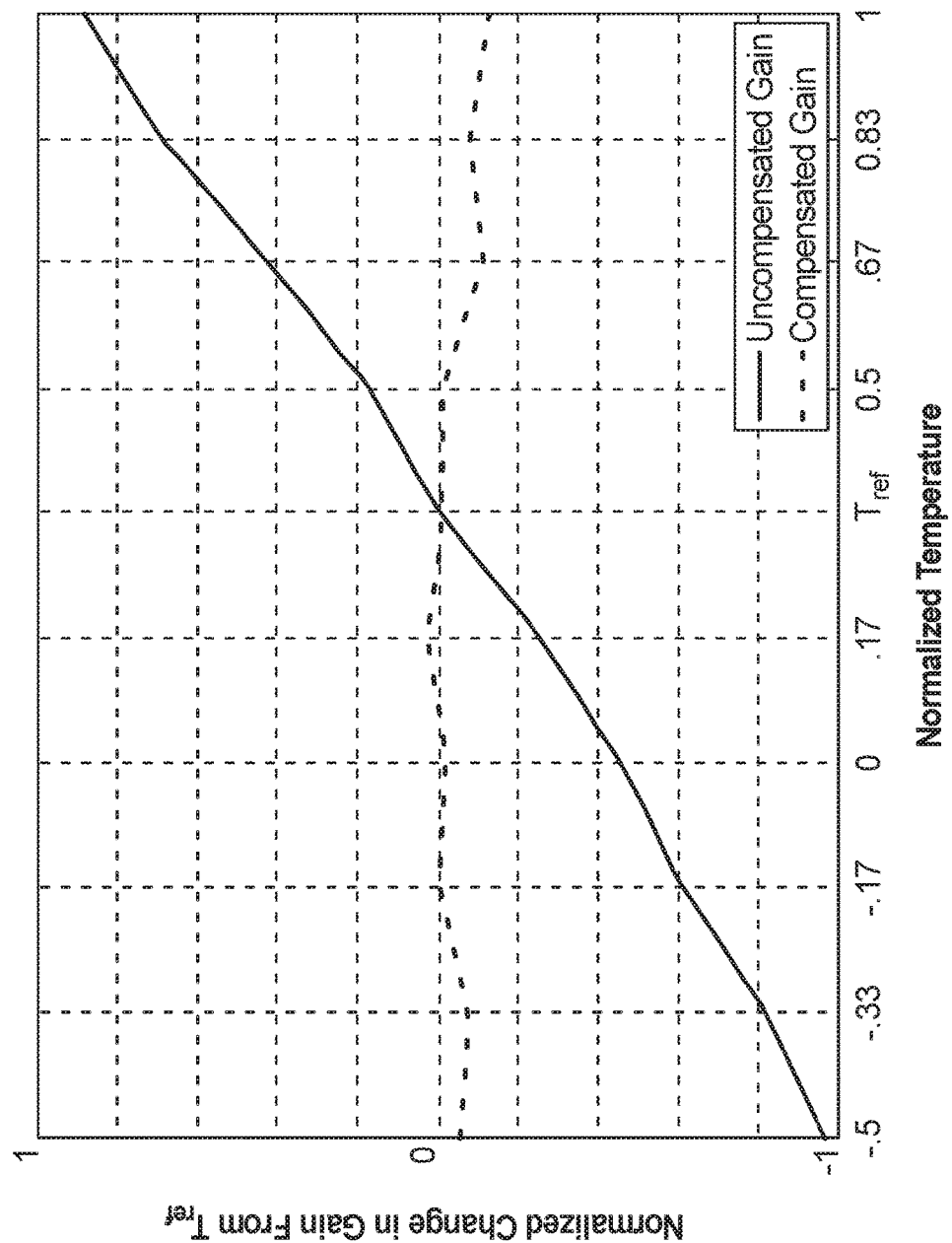
FIG. 2 is a graph for comparing system gain in non-temperature controlled FPAs over a range of temperatures with and without compensation in accordance with embodiments in the present disclosure.

With reference now to FIG. 2, two plots are shown for system gain in a non-temperature controlled FPA. One plot is for uncompensated gain, and one is for compensated gain, and each is on the same normalized scale for comparison. The vertical scale is normalized change in system gain from the system gain at Tref. The horizontal scale is normalized temperature, and Tref is identified on the horizontal axis. The plot for uncompensated gain varies considerably as a function of temperature. By contrast, the plot for compensated gain shows that when system gain is temperature compensated as disclosed herein, the system gain can remain substantially constant over a range of temperatures. This demonstrates that the systems and methods disclosed herein provide for substantially constant system gain for non-temperature controlled FPAs over a range of temperatures.

Those skilled in the art will readily appreciate that the methods described herein can be implemented using machine readable instructions to carry out the operations described herein, e.g., executed in a module for executing machine readable instructions such as module 112 supporting imaging system 100.

A method of correcting pixel non-uniformity, e.g., in system 100, for varying temperature includes determining an FPA temperature, e.g., using sensor 106, and calculating a non-uniformity correction map on a pixel by pixel basis for the FPA, e.g., FPA 102, wherein the non-uniformity correction for each pixel is a function of the FPA temperature and empirically derived coefficients. The method also includes applying the non-uniformity correction map at the FPA temperature to condition output of the FPA to produce temperature dependent non-uniformity corrected image data, which can be output, e.g., by module 112.

Applying the non-uniformity correction map can be performed without controlling the temperature of the FPA 102. The function of the FPA temperature, system non-uniformity correction at the reference temperature, and empirically derived coefficients can incorporate approximating change in a respective pixel's dark level to a desired correction.

Traditional non-uniformity correction utilizes a model that corrects pixels from an absolute reference, meaning the pixel is corrected to be at a digital level for an input digital level and temperature pair. In contrast, the model used herein utilizes an approach that corrects a given pixel in a relative reference, meaning the pixel is corrected to minimize the difference from the normal. The change in gain from an offset is smooth and significantly easier to model. The following calculations are derived from a model that reduces or minimizes non-uniformity and number of calibration coefficients.

Calculating a non-uniformity correction map on a pixel by pixel basis, wherein the non-uniformity correction for each pixel is a function of the FPA temperature and empirically derived coefficients can be governed by $$\delta Ic = [p0 + p1 \times \log 10(T)] \times \left( Iraw - \sum_{n=0,1,3,5} \left( a_n \times \left( \frac{T - T_{min}}{T_{max} - T_{min}} \right)^n \right) \right)$$

wherein δIc represents the change for a respective pixel from its dark level to a desired correction value, T is the FPA temperature in digital numbers, Iraw is the raw value of the pixel in digital numbers, Tmax and Tmin are maximum and minimum temperatures, respectively, for normalizing temperature T, e.g., maximum and minimum operating temperatures, and p0, p1, and a0, a1, a3, and a5 are empirically derived coefficients. Systems and methods as described herein can be used to correct pixel by pixel non-uniformity over a range of FPA temperatures and light levels.

Figure 3:
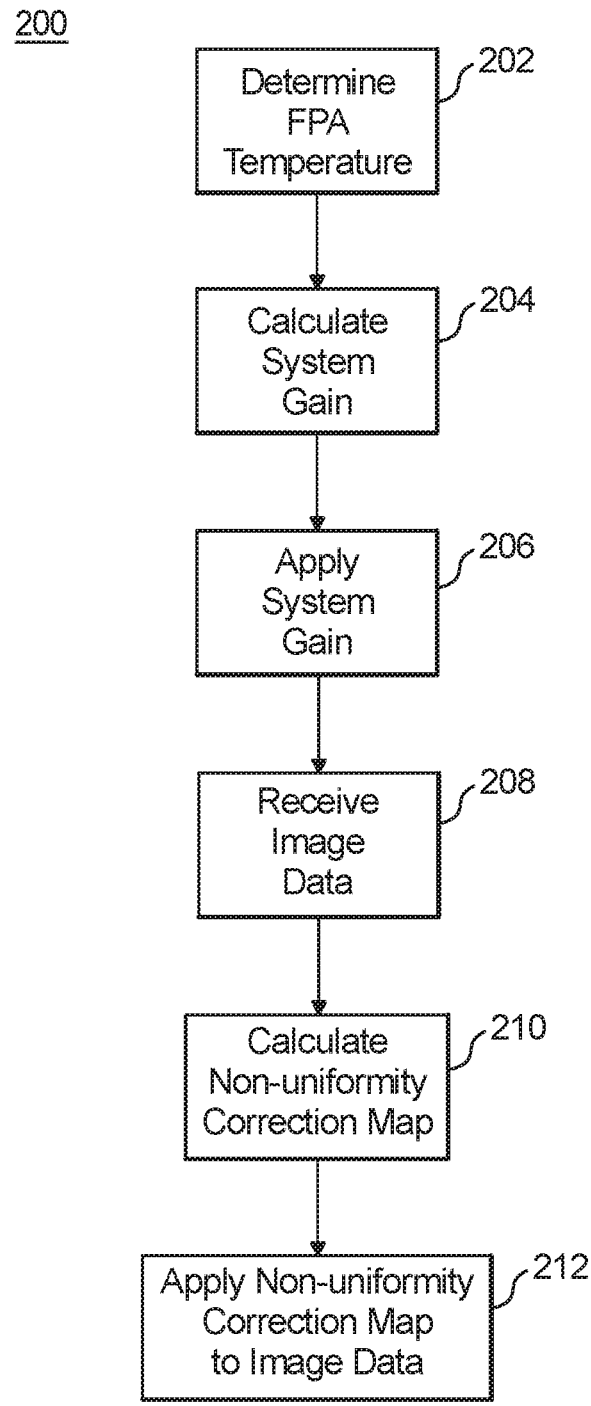
FIG. 3 is a diagram of an exemplary embodiment of a method in accordance with the present disclosure, showing use of gain normalization and pixel non-uniformity correction together to enable imaging over a range of temperatures in a non-temperature controlled imaging system.

With reference now to FIG. 3, it is also contemplated that if system gain corrections are made for temperature variation in non-temperature controlled (or partially non-temperature controlled) imaging systems, such corrections can advantageously reduce the digital footprint for non-uniformity corrections as disclosed herein. A method 200 of normalizing FPA system gain and correcting pixel non-uniformity for varying temperature includes determining an FPA temperature, as indicated by box 202, e.g., using a temperature sensor such as sensor 106. Method 200 also includes calculating an FPA system gain as a function of the FPA temperature as described above, and applying the FPA system gain at the FPA temperature to condition output of the FPA to produce temperature independent image data, as indicated by boxes 204 and 206, respectively.

Applying the FPA system gain includes applying the FPA system gain to a ROIC, e.g., ROIC 104. Method 200 can include receiving imaging data from the FPA, as indicated by box 208. This can include transmitting the imaging data to the ROIC from the FPA. The image data can be received by the ROIC from the FPA with the system gain already applied to the ROIC.

The method also includes calculating a non-uniformity correction map on a pixel by pixel basis for the FPA, as indicated by box 210, wherein non-uniformity correction for each pixel is a function as described above. Calculating the non-uniformity correction map includes a process that does not itself perform a system gain correction in calculating the non-uniformity correction map. The system gain correction process described above relieves the need that there would otherwise be within the non-uniformity correction process to calculate system gain, which is what provides the potential advantages described above for reducing the digital footprint of non-uniformity corrections.

The non-uniformity map can be applied to the imaging data from the ROIC, as indicated by box 212. The system gain can be calculated in a module, e.g., module 112, and applied by the module to the ROIC. The non-uniformity corrections can be calculated in a module, e.g., module 112, and applied to the imaging data within module 112.

The module is thus operatively connected to the FPA through the ROIC for system gain and non-uniformity corrections with no need for a temperature control device connected for temperature control of the FPA. The two processes, one for system gain control and the other for non-uniformity correction, can be agnostic of each other or the results of each other, and can thus be performed in parallel with one another.

Potential advantages of utilizing systems and methods as disclosed herein include eliminating hardware for temperature control, such as thermoelectric cooling devices, from imaging systems. It is also contemplated that hybrid systems can be used, wherein temperature control only partially controls temperature of the FPA, in which case any remaining FPA temperature variation can be system-gain-corrected using techniques as disclosed herein, and in which case any remaining FPA temperature induced non-uniformity can be corrected using techniques as disclosed herein. Reducing or eliminating temperature control devices can remove a major contributor to power consumption and hardware size.

The methods and systems of the present disclosure, as described above and shown in the drawings, provide for imaging systems with superior properties including reducing or eliminating the need for temperature control, while providing accurate imaging data over a range of ambient temperatures. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of normalizing FPA system gain and correcting pixel non-uniformity for varying temperature comprising:
   determining an FPA temperature;
   calculating an FPA system gain as a function of the FPA temperature;
   applying the FPA system gain at the FPA temperature to condition output of the FPA to produce temperature independent image data;
   calculating a non-uniformity correction map on a pixel by pixel basis for the FPA, wherein non-uniformity correction for each pixel is a function of the FPA temperature; and
   applying the non-uniformity correction map to the imaging data from the FPA to produce temperature dependent non-uniformity corrected image data, wherein at least one of:
   calculating the FPA system gain is governed by $$V\text{gain}(T) = [(p1 + p3*T\text{ref})*V\text{gainref} + p2*(T\text{ref} - T)]/(p1 + p3*T)$$

wherein Vgain is a variable control level which correlates to the FPA system gain, Vgainref is the value of the control level which sets the FPA system gain at the reference temperature (Tref), and p1, p2, and p3 are empirically derived coefficients, and/or
   calculating a non-uniformity correction map on a pixel by pixel basis is governed by $$\delta Ic = [p0 + p1 \times \log10(T)] \times \left( Iraw - \sum_{n=0,1,3,5} \left( a_n \times \left( \frac{T - T_{min}}{T_{max} - T_{min}} \right)^n \right) \right)$$

wherein δIc represents the change for a respective pixel from its dark level to a desired correction value, Iraw is the raw value of the pixel in digital numbers, Tmax and Tmin are maximum and minimum temperatures, respectively, for normalizing FPA temperature T, and p0, p1, and a0, a1, a3, and a5 are empirically derived coefficients.

2. The method as recited in claim 1, wherein calculating the non-uniformity correction map includes a process that does not itself perform a system gain correction in calculating the non-uniformity correction map.

3. The method as recited in claim 1, wherein calculating the FPA system gain includes calculating the FPA system gain as a function of system gain for the FPA at a reference temperature and empirically derived coefficients.

4. The method as recited in claim 1, wherein non-uniformity correction for each pixel is a function of empirically derived coefficients.

5. The method as recited in claim 1, wherein applying the FPA system gain includes applying the FPA system gain to a ROTC operatively connected to the FPA to condition electrical signals from the FPA for imaging.

6. The method as recited in claim 1, further comprising:
   receiving the imaging data from the FPA, wherein receiving imaging data from the FPA includes transmitting the imaging data to the ROIC from the FPA, wherein the ROIC is operatively connected to the FPA to condition electrical signals from the FPA for imaging.

7. The method as recited in claim 6, wherein applying the non-uniformity correction map to the imaging data includes applying the non-uniformity correction map to the imaging data from the ROIC.

8. The method as recited in claim 1, wherein applying the FPA system gain and applying the non-uniformity correction map are performed without controlling the temperature of the FPA.

9. An imaging system comprising:
   a focal plane array (FPA);
   a temperature sensor operatively connected to measure temperature of the FPA; and
   a module operatively connected to the FPA and temperature sensor to:
   calculate FPA system gain for the FPA as a function of the FPA temperature, system gain for the FPA at a reference temperature, and empirically derived coefficients, and to apply the FPA system gain to condition output of the FPA to produce temperature independent image data; and
   apply a non-uniformity correction map on a pixel by pixel basis for the FPA as a function of the FPA temperature and empirically derived coefficients, and to apply the non-uniformity correction map to condition output of the FPA to produce temperature dependent non-uniformity corrected image data, wherein at least one of:
   calculating the FPA system gain is governed by $$V\text{gain}(T) = [(p1 + p3*T\text{ref})*V\text{gainref} + p2*(T\text{ref} - T)]/(p1 + p3*T)$$

wherein Vgain is a variable control level which correlates to the FPA system gain, Vgainref is the value of the control level which sets the FPA system gain at the reference temperature (Tref), and p1, p2, and p3 are empirically derived coefficients, and/or
   applying a non-uniformity correction map on a pixel by pixel basis is governed by $$\delta Ic = [p0 + p1 \times \log10(T)] \times \left( Iraw - \sum_{n=0,1,3,5} \left( a_n \times \left( \frac{T - T_{min}}{T_{max} - T_{min}} \right)^n \right) \right)$$

wherein δIc represents the change for a respective pixel from its dark level to a desired correction value, Iraw is the raw value of the pixel in digital numbers, Tmax and Tmin are maximum and minimum temperatures, respectively, for normalizing FPA temperature T, and p0, p1, and a0, a1, a3, and a5 are empirically derived coefficients.

10. The system as recited in claim 9, further comprising a ROIC operatively connected to the FPA to condition electrical signals from the FPA for imaging, wherein the module is operatively connected to the FPA through the ROIC, wherein applying the FPA system gain includes applying the FPA system gain to the ROIC, and wherein applying the non-uniformity correction map to the imaging data includes applying the non-uniformity correction map to the imaging data from the ROIC.

11. The system as recited in claim 9, wherein there is no temperature control device connected for temperature control of the FPA.

12. The system as recited in claim 9, wherein the FPA includes a buffered current mirror pixel architecture.

13. The system as recited in claim 9, wherein the FPA includes an InGaAs material for infrared imaging.

\* \* \* \* \*